Patented July 16, 1940

2,208,095

UNITED STATES PATENT OFFICE 2,208,095

PROCESS OF PRODUCING INSOLUBLE CONDENSATION PRODUCTS CONTAINING SULPHUR AND NITROGEN

Paul Esselmann, Wolfen, Kreis Bitterfeld, and Karl Kösslinger and Joseph Düsing, Dessau, Germany, assignors to I. G. Farbenindustrie Aktiengesellschaft, Frankfort - on - the - Main, Germany No Drawing. Application December 29, 1937, Serial No. 182,248. In Germany January 5, 1937

13 Claims. (Cl. 260—2)

The present invention relates to a process of producing insoluble condensation products, and more particularly to condensation products containing sulphur and nitrogen.

It is an object of the invention to provide a process by which these new insoluble condensation products are produced.

A further object of the invention is the provision of new and improved resinous compositions which are substantially insoluble in dilute acid or alkaline liquids.

A further object is the provision of new synthetic resins containing both sulphur and nitrogen.

Further objects of the invention will become apparent from the detailed specification and the examples following hereinafter.

The invention is based on the observation that by reacting alkylene imines such as for instance ethylene imine, N-methylethyleneimine, N-phenylethyleneimine etc. on sulphur-containing compounds like carbon disulphide, carbonyl sulphide, thiophosgene, sulphur chloride, there are produced resinous compositions completely insoluble in water, dilute acids and dilute alkalies.

It is preferable to bring 1 mol of the base into reaction with at least 1 mol of carbon disulphide or any of the other sulphur-containing compounds referred to above and to bring the reaction to an end in the presence of a slight excess of carbon disulphide because if there is an excess of the imine soluble products may be produced. The reaction may advantageously occur in an aqueous medium. During the reaction sufficient heat is produced to keep it going, but at the end of the reaction it is advantageous to heat the reaction liquid.

It has further been found that by reacting carbon disulphide and ethylene imine in the presence of elementary sulphur a glassy resin permeable to light is produced, which owing to its thermoplastic properties may find a still wider application than the product obtained without the addition of sulphur. The condensation product of for instance $CS_2$ and ethyleneimine is insoluble in caustic alkalies and acids and may be easily emulsified in aqueous solutions, for instance caustic alkali, water or viscose.

The condensation leads to improved products if the reaction of carbon disulphide and ethyleneimine or other alkyleneimines is carried out in the presence of aqueous alkali, such as for instance caustic soda lye. The condensation products have substantially higher melting points if otherwise the same conditions are observed as during the neutral condensation. Sulphur may also be added during the condensation in an alkaline medium whereby a further change and improvement of the properties of the resulting resinous product may be obtained. The condensation products with sulphur are thermoplastic and may be advantageously used for the forming of articles from artificial resins and as additions to lacquers. The following examples serve to illustrate the invention without limiting the scope of the invention to the specific details set forth therein.

Example 1.—To 2 liters of a solution of 15 per cent strength of ethyleneimine in water there are added by drops and while cooling and stirring 600 grams of carbon disulphide. When the whole of the latter has been added the liquid is finally heated on the water bath. The precipitate thus produced is filter-pressed, extracted with boiling water and preferably further treated with caustic soda lye of 10 per cent strength and sulphuric acid of 10 per cent strength. The body thus purified and containing nitrogen and sulphur is a fine crystalline yellow-white powder completely insoluble in aqueous, neutral and acid solvents and in most organic solvents; its melting point is about 72° C. to about 74° C. The constitution of the substance has not hitherto been explained.

Example 2.—When working with ethyleneimine it is preferable not to use only the monomeric substance, but to use a polymeric ethyleneimine which may be obtained in a manner known in the art, for instance by partly neutralizing with sulphuric acid. Another way of obtaining polymeric ethyleneimine suitable for the purpose of the present invention is as follows:

Into an aqueous solution containing 30 per cent of ethyleneimine a stream of carbon dioxide is introduced while cooling until the solution is no longer dyed with phenol phthalein. During the introduction of carbon dioxide the solution gets more and more viscous, which indicates progressing polymerization. Polymerization of the solution may be still further enhanced by leaving the solution standing. To the viscous solution of the polymeric ethyleneimine there is now added carbon disulphide in molecular proportion and the reaction mixture is heated after some time for 12 hours in a reflux condenser. The solution liberates carbon dioxide and the insoluble reaction product is gradually precipitated. The condensation product is boiled repeatedly with sodium hydroxide, sulphuric acid, and finally with water to which is added a wetting agent.

The purified product is insoluble in neutral, acid and alkaline aqueous liquids and in most of the organic solvents. With a nitrogen content of 14.78 per cent and a sulphur content of 22.7 per cent the product has a melting point of 228° C. It differs from the body obtained according to the foregoing example by being insoluble in aniline and glacial acetic acid.

The reaction of polymeric ethyleneimine or of ethyleneimine which is partly polymerized or which contains a certain amount of the polymeric product is considerably less violent than the reaction of the monomeric product which may be of importance for the practical production of the resins.

*Example 3.*—1 mol of C-phenylethyleneimine is dissolved in water to yield a solution containing 15 per cent of C-phenylethyleneimine. To this solution there are added while cooling and stirring 1 mol of carbon disulphide in drops. The reaction mixture is then heated on the water bath, the amber-colored precipitate is filtered off and thoroughly purified with sodium hydroxide and sulphuric acid, both of 10 per cent strength. A product is obtained which melts at about 92° C.

*Example 4.*—In an aqueous solution containing 15 per cent of C-phenylethyleneimine 10 per cent of the weight of C-phenylethyleneimine of polymeric ethyleneimine are emulsified (the polymeric ethyleneimine is obtained by adding to the monomeric compound a little sulphuric acid). To the mixture of ethyleneimine and C-phenylethyleneimine there are added in the manner described in the foregoing example molecular proportions of CS₂. In this manner the slightly yellow resin is obtained which after boiling with water, sodium hydroxide and sulphuric acid melts at 134° C.

*Example 5.*—To an aqueous solution of 1 mol N-benzoylethyleneimine of 30 per cent strength 1 mol of carbon disulphide is slowly added while cooling and stirring. The reaction product is treated and purified as in the foregoing examples. A resinous body is obtained which melts at about 152° C.

*Example 6.*—To an aqueous solution of 1 mol propyleneimine of 15 per cent strength there is added in drops 1 mol of carbon disulphide while cooling and stirring. When the addition is finished the reaction mixture is heated on the water bath and the yellow precipitate which is produced is filtered off. The resinous product is thoroughly purified with the aid of soda lye and sulphuric acid, both of 10 per cent strength. In this manner a product is obtained which melts at 85° C.

*Example 7.*—80 parts of propyleneimine solution of 30 per cent strength are mixed with 20 parts of polymerized ethylene imine obtained according to Example 1 with carbon dioxide and the mixture is diluted to yield a 30 per cent aqueous solution. To this solution there is slowly added carbon disulphide in drops while stirring, the amount of carbon dioxide being such that for 1 mol imine 1 mol of carbon disulphide is added. The temperature during the addition of carbon disulphide should not exceed 20° C. After standing for 4 hours the reaction mixture is heated for 12 hours in a reflux condenser whereat at the start the mixture foams a little. The white to yellow condensation product is boiled several times with soda lye, sulphuric acid, and finally with water. The melting point of the resultant resin depends upon the degree of polymerization of the polymerized ethyleneimine.

*Example 8.*—1800 cc. of carbon disulphide in which 376 grams of sulphur have been dissolved are added to 2 liters of a 50 per cent aqueous solution of ethyleneimine. In this manner a yellow resinous product is obtained which may be melted to yield a glassy mass. The resin contains 32.5 per cent of sulphur and 13.7 per cent of nitrogen. The product has thermoplastic properties.

*Example 9.*—In a flask which is provided with a reflux condenser there are added to a solution of 100 cc. carbon disulphide containing 18 grams of sulphur 40 cc. of N-benzylethyleneimine slowly and in drops. Since the reaction proceeds rapidly the reaction mixture must be cooled and the base added very slowly. The whole reaction mixture becomes solid after the end of the reaction and yields a yellow mass. This reaction product is treated in a reflux condenser with a further 50 cc. of carbon disulphide. The product thus becomes insoluble, it is dried and ground and purified by boiling with dilute sodium hydroxide and water. The resin has a nitrogen content of 6.35 per cent and a melting point of about 148° C.

*Example 10.*—16 grams of sulphur are dissolved in 100 grams of carbon disulphide and 57 grams of 1.2-propyleneimine are slowly added while cooling in a reflux condenser. After the reaction is completed the reaction product is melted to yield a brownish-yellow transparent resin which is insoluble in dilute acids and alkalies. 100 parts of sulphur are dissolved in 500 parts of carbon disulphide and 500 parts of polymerized ethyleneimine in a solution of 30 per cent strength are slowly added while stirring. The polymeric ethyleneimine is obtained by treating with carbon dioxide until its reaction is neutral and leaving the polymerization product standing for 2 days at room temperature. During the addition of the polymerizate to the solution of carbon disulphide a rapid liberation of gas and warming of the solution occurs. After the reaction is completed the yellowish-brown resin is boiled with dilute sodium hydroxide to which were added a little sodium sulphite until the solution is absolutely clear. The resin is then filtered off, and after washing with hot water and drying is ground. The resin gets brown at 160° C. and starts melting at 172° C. It contains 11.66 per cent of nitrogen and 26.4 per cent of sulphur.

*Example 11.*—A solution of 90 grams of sulphur in 270 grams of carbon disulphide is reacted with 600 grams of polymerized ethyleneimine of 50 per cent strength containing carbon dioxide and the product thus obtained is purified in similar manner as described in Example 4. The transparent yellow resin has a melting point of 205° C. It is absolutely insoluble in dilute acids and alkalies and may be easily dyed with acid dyes.

*Example 12.*—A mixture of 2 liters of a solution containing 50 per cent of ethyleneimine and 1 liter of a solution containing 9 per cent of sodium hydroxide are reacted while stirring with 1.8 kilos of carbon disulphide which is added slowly and in drops. The reaction mixture is left standing over night and then heated on the water bath for 4 hours in a reflux condenser with another 500 cc. of carbon disulphide. The yellow final product is repeatedly boiled with water. The purified resin has after drying a melting point of about 136° C.

*Example 13.*—A mixture consisting of 1½ liters of a solution containing 50 per cent of monomeric ethyleneimine base and 650 cc. of a solution containing 30 per cent of the carbon dioxide-ethyleneimine for 24 hours during which time the polymerization proceeds further. To this viscous solution there are added 1 liter of potassium hydroxide in a 10 per cent solution and subsequently a solution of 396 grams sulphur in 1.8 kilos of carbon disulphide. After leaving the mixture standing for 4 hours the solvents are distilled off and the final product is melted after purification. The yellow resin which has a nitrogen content of 11.5 per cent is especially stable against dilute acids and alkalies. Resins of varying melting points are obtained according to the degree of polymerization of the ethyleneimine base.

Example 14.—To a mixture of 120 grams of a solution containing 50 per cent of 1.2-propyleneimine and 500 cc. of a solution containing 9 per cent of sodium hydroxide 100 grams of carbon disulphide are slowly added. The solid body which precipitates is separated from the liquid and repeatedly boiled with dilute sulphuric acid. In melting the yellow resin gets brown. The resin is insoluble in dilute acids and lyes and has great affinity for acid wool dyestuffs.

Example 15.—Pure carbonyl sulphide is introduced into an aqueous solution containing 15 percent of ethyleneimine, the amount of reactants being such that 1 mol of carbonyl sulphide is added for 1 mol of ethyleneimine. If ethyleneimine is used which is not polymerized a product is obtained in this manner which after thorough purification contains 14.6 per cent of nitrogen and 22.9 per cent of sulphur and has a melting point of 181° C.

Example 16.—4.5 liters of an aqueous solution containing 5 per cent of monomeric ethyleneimine are mixed with 500 cc. of a solution containing 15 per cent of polymeric ethyleneimine. Into this mixture there is introduced a stream of carbonyl sulphide until no longer any precipitate is formed. The purified white reaction product contains 14 per cent of nitrogen and 11.9 per cent of sulphur and has the melting point 231° C.

Example 17.—To an aqueous solution containing 15 per cent of ethyleneimine there is added while cooling $S_2Cl_2$ until precipitation is complete. The solution which contains a small excess of sulphur chloride is heated for 12 hours in a reflux condenser. The resultant yellow precipitate is filtered off and purified by repeated boiling with water.

Example 18.—To an aqueous solution containing 15 per cent of ethyleneimine thiophosgene is added drop by drop while cooling well until no further precipitate is formed. A white precipitate separates which is insoluble in dilute acids and alkalies and which contains after boiling with water about 16.6 per cent of nitrogen and 3.7 per cent of sulphur.

Example 19.—To an aqueous solution of 80 grams of ethyleneimine containing 75 per cent of polymeric ethyleneimine 100 grams of thiophosgene are added carefully at room temperature. After a short time a violent reaction sets in. The temperature rises rapidly up to 102° C. and a reddish resinous mass is produced. After the reaction is completed the voluminous resin is treated with benzene on a steam bath. The dried condensation product has chocolate color and contains 12.1 per cent of nitrogen.

Example 20.—To 80 cc. of an aqueous solution of ethyleneimine polymerized by the action of carbon dioxide 75 cc. of sulphur chloride are added carefully by and by. A very violent reaction sets in and the temperature rises spontaneously up to 120° C. The resinous yellow mass is purified with hot benzene. The product contains 11.8 per cent of nitrogen and shows good affinity for acid dyes.

What we claim is:

1. A process of producing insoluble condensation products containing nitrogen and sulphur, which comprises polymerizing together an alkyleneimine having a three-membered ring and a non-metal sulphide selected from the group consisting of carbon disulphide, carbonyl sulphide, thiophosgene, and sulphur chloride.

2. A process of producing insoluble condensation products containing nitrogen and sulphur, which comprises polymerizing together an alkyleneimine having a three-membered ring and at least equimolecular proportions of a non-metal sulphide of the group consisting of carbon disulphide, carbonyl sulphide, thiophosgene, and sulphur chloride.

3. A process of producing insoluble condensation products containing nitrogen and sulphur, which process comprises polymerizing in an aqueous solution an alkyleneimine having a three-membered ring and at least equimolecular proportions of a non-metal sulphide of the group consisting of carbon disulphide, carbonyl sulphide, thiophosgene, and sulphur chloride.

4. A process of producing insoluble condensation products containing nitrogen and sulphur, which comprises polymerizing in an aqueous solution containing inorganic alkali an alkyleneimine having a three-membered ring together with at least equimolecular proportions of a non-metal sulphide of the group consisting of carbon disulphide, carbonyl sulphide, thiophosgene, and sulphur chloride.

5. A process of producing an insoluble condensation product containing nitrogen and sulphur, which comprises polymerizing in an aqueous solution ethyleneimine together with at least equimolecular proportions of carbon disulphide.

6. A process of producing an insoluble condensation product containing nitrogen and sulphur, which comprises polymerizing in an aqueous solution ethyleneimine together with at least equimolecular proportions of carbon disulphide containing dissolved therein elementary sulphur.

7. A process of producing an insoluble condensation product containing nitrogen and sulphur, which comprises polymerizing in an aqueous solution ethyleneimine together with at least equimolecular proportions of carbonyl sulphide.

8. A process of producing an insoluble condensation product containing nitrogen and sulphur, which comprises polymerizing in an aqueous solution ethyleneimine together with at least equimolecular proportions of thiophosgene.

9. As a new product a synthetic resin substantially insoluble in aqueous acid and alkali solutions of 10 per cent strength, said resin containing both nitrogen and sulphur and comprising an interpolymer of an alkyleneimine having a three-membered ring and a non-metal sulphide of the group consisting of carbon disulphide, carbonyl sulphide, thiophosgene and sulphur chloride.

10. As a new product a synthetic resin substantially insoluble in aqueous acid and alkali solutions of 10 per cent strength, said resin being a mixed polymerizate from ethyleneimine and carbon disulphide.

11. As a new product a synthetic resin substantially insoluble in aqueous acid and alkali solutions of 10 per cent strength, said resin being a mixed polymerizate and consisting of ethyleneimine, carbon disulphide and sulphur.

12. As a new product a synthetic resin substantially insoluble in aqueous acid and alkali solutions of 10 per cent strength, said resin being a mixed polymerizate from ethyleneimine and carbonyl sulphide.

13. As a new product a synthetic resin substantially insoluble in aqueous acid and alkali solutions of 10 per cent strength, said resin being a mixed polymerizate from ethyleneimine and thiophosgene.

PAUL ESSELMANN.
KARL KÖSSLINGER.
JOSEPH DÜSING.